Figure 1:
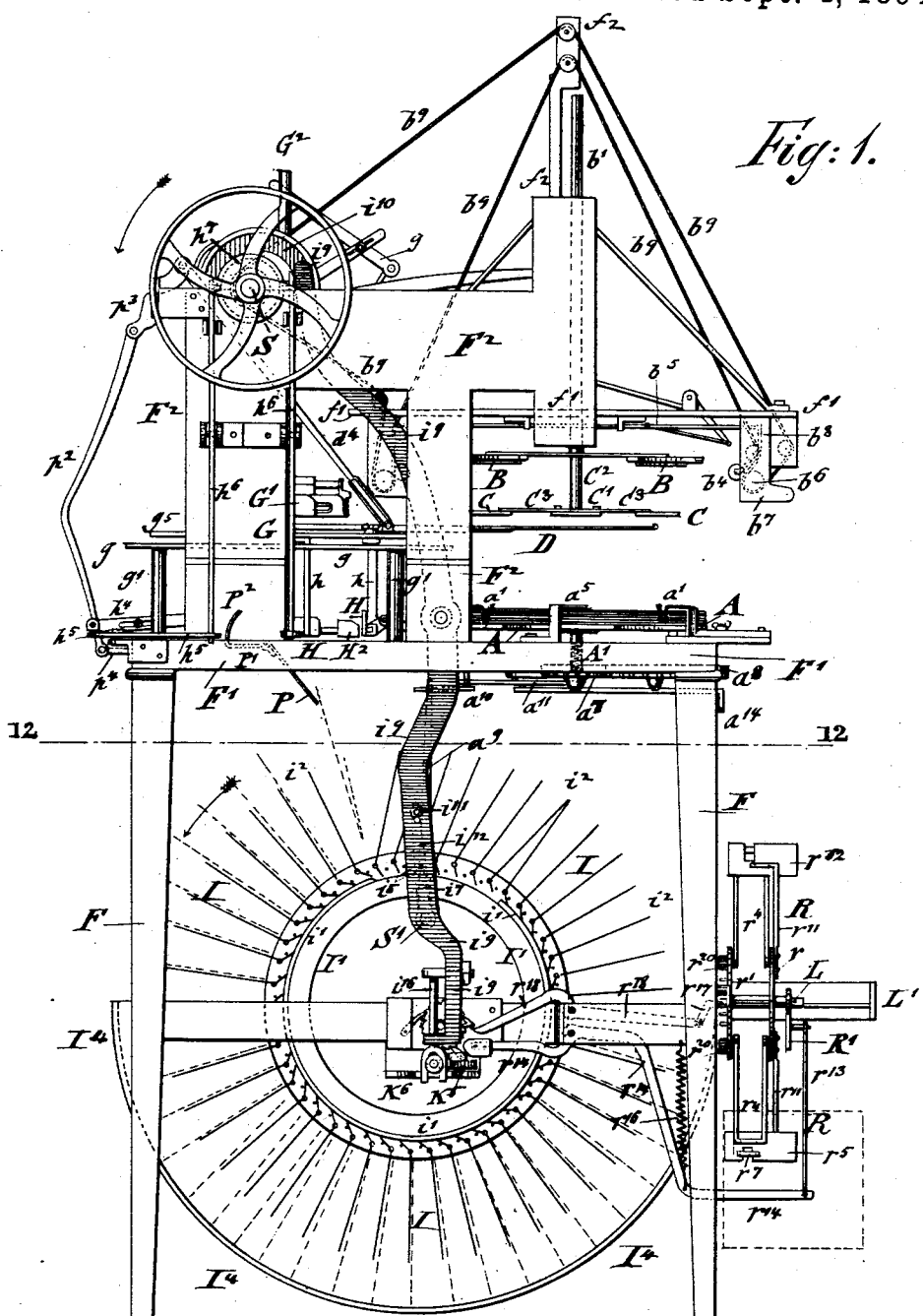

(No Model.) 10 Sheets—Sheet 1.

J. & E. R. CORBETT.
ENVELOPE MACHINE.

No. 525,536. Patented Sept. 4, 1894.

*Fig: 1.*

WITNESSES: Charles Schroeder, Charles D. Bles

INVENTORS: Joseph Corbett, Edwin R. Corbett

BY Goepel & Raegener
ATTORNEYS.

(No Model.)

J. & E. R. CORBETT.
ENVELOPE MACHINE.

No. 525,536. Patented Sept. 4, 1894.

WITNESSES:
Charles Schroeder
Charles D. Bles

INVENTORS:
Joseph Corbett
Edwin R. Corbett
BY
ATTORNEYS.

(No Model.)

J. & E. R. CORBETT.
ENVELOPE MACHINE.

10 Sheets—Sheet 3.

No. 525,536.

Patented Sept. 4, 1894.

Fig: 3.

WITNESSES:
Charles Schroeder.
Charles D. Bles.

INVENTORS:
Joseph Corbett
Edwin R. Corbett
BY
ATTORNEYS.

(No Model.) 10 Sheets—Sheet 4.

J. & E. R. CORBETT.
ENVELOPE MACHINE.

No. 525,536. Patented Sept. 4, 1894.

WITNESSES:
Charles Schroeder.
Charles D Bles

INVENTORS:
Joseph Corbett
Edwin R. Corbett
BY
ATTORNEYS.

(No Model.) 10 Sheets—Sheet 5.
J. & E. R. CORBETT.
ENVELOPE MACHINE.

No. 525,536. Patented Sept. 4, 1894.

(No Model.) 10 Sheets—Sheet 7.

J. & E. R. CORBETT.
ENVELOPE MACHINE.

No. 525,536. Patented Sept. 4, 1894.

WITNESSES:
Charles Schroeder
Charles D. Bles

INVENTORS
Joseph Corbett
Edwin R. Corbett
BY
Gorges Raegner
ATTORNEYS

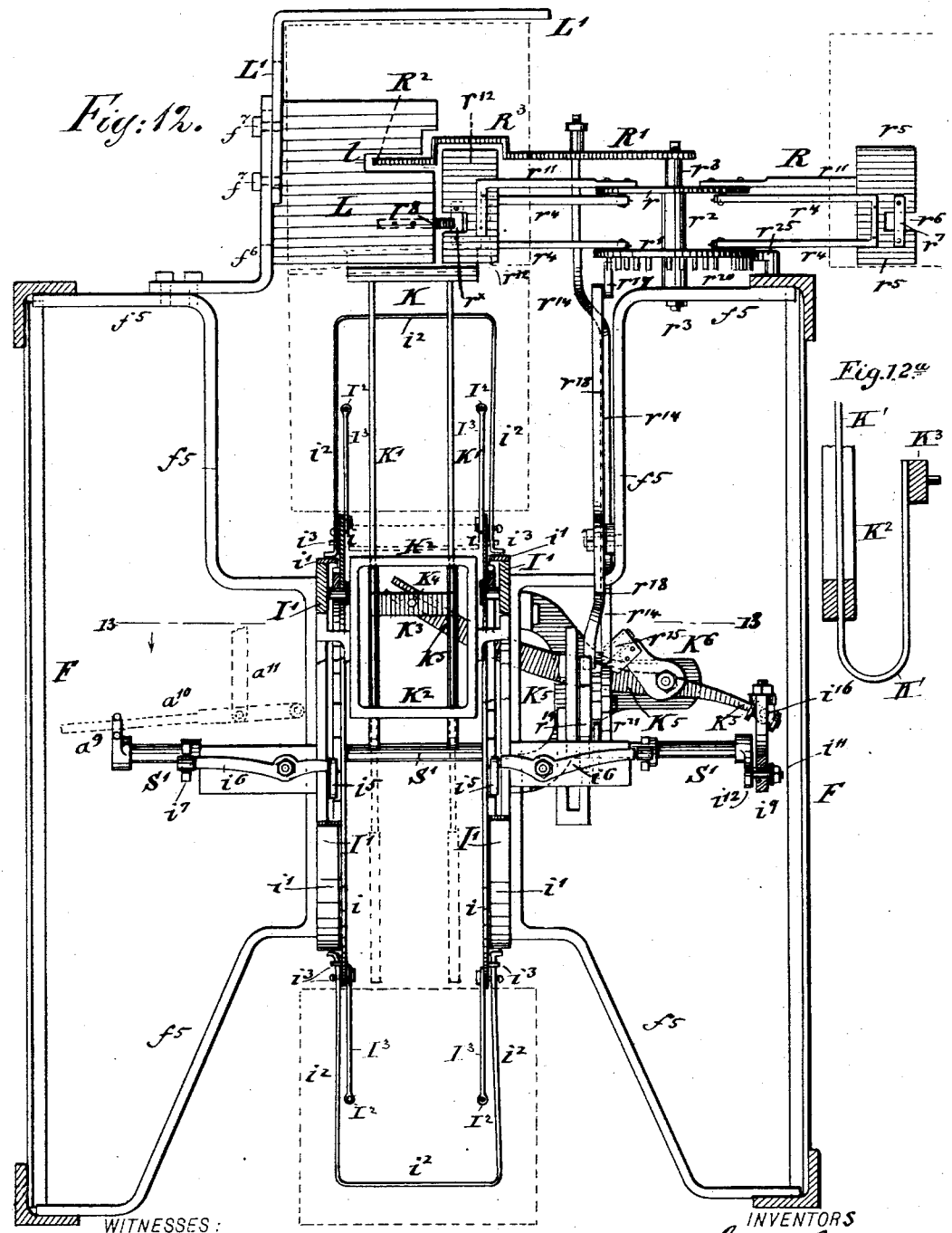

(No Model.)  J. & E. R. CORBETT.  10 Sheets—Sheet 9.
ENVELOPE MACHINE.
No. 525,536.  Patented Sept. 4, 1894.
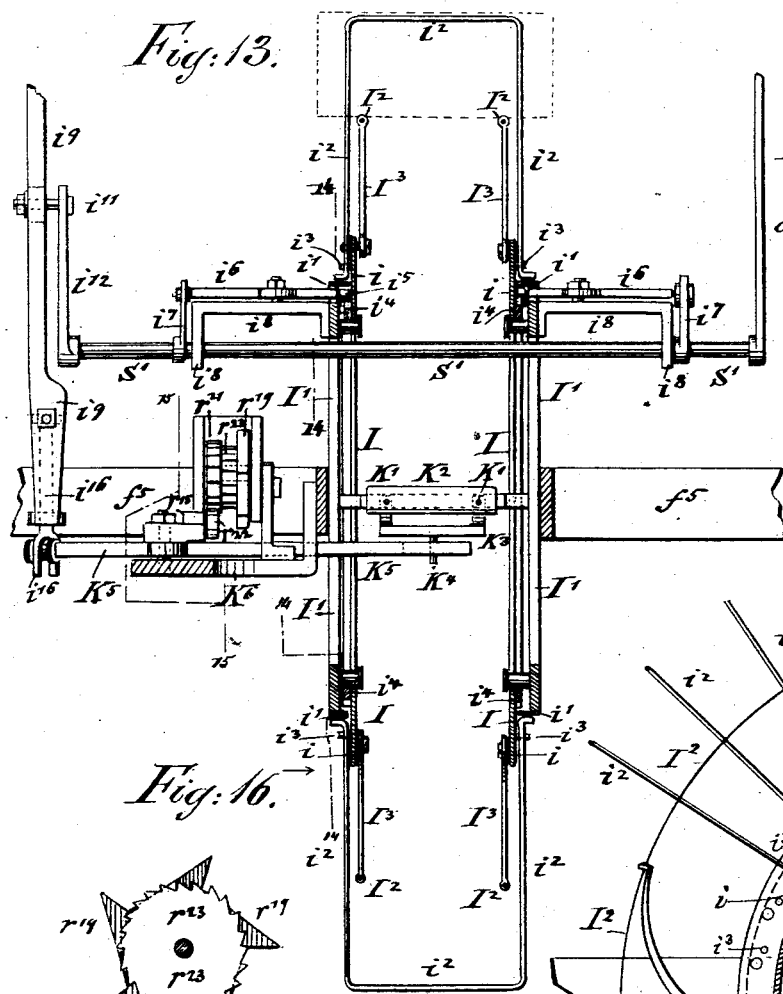
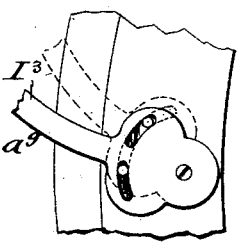
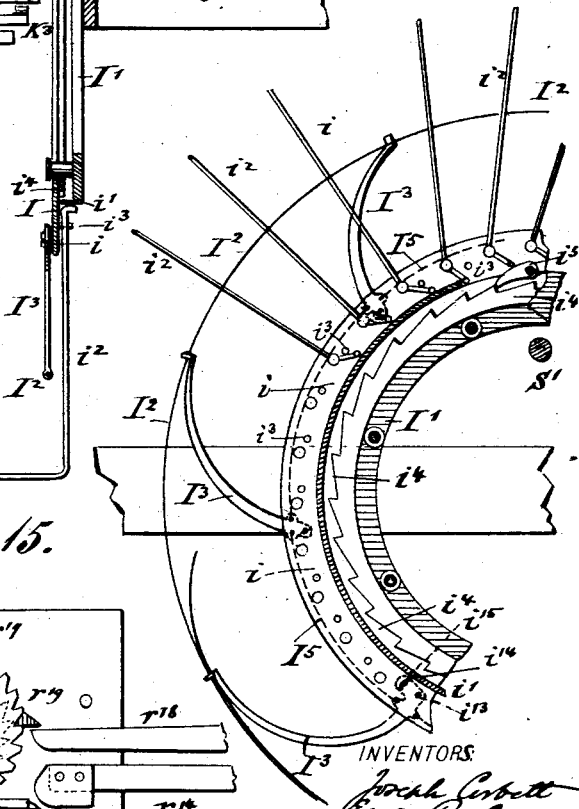
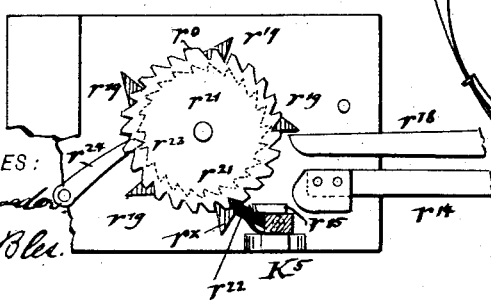

(No Model.)

J. & E. R. CORBETT.
ENVELOPE MACHINE.

No. 525,536. Patented Sept. 4, 1894.

WITNESSES:
Charles Schroeder
Charles D. Bles

INVENTORS:
Joseph Corbett
Edwin R. Corbett
BY
ATTORNEYS.

UNITED STATES PATENT OFFICE.

JOSEPH CORBETT AND EDWIN R. CORBETT, OF NEW YORK, N. Y., ASSIGNORS TO THOMAS F. SHAW, OF SAME PLACE.

ENVELOPE-MACHINE.

SPECIFICATION forming part of Letters Patent No. 525,536, dated September 4, 1894.

Application filed February 6, 1892. Serial No. 420,586. (No model.)

*To all whom it may concern:*

Be it known that we, JOSEPH CORBETT and EDWIN R. CORBETT, citizens of the United States, residing in the city of New York, in the county and State of New York, have invented certain new and useful Improvements in Envelope-Machines, of which the following is a specification.

This invention relates to certain improvements in envelope-machines of that class in which the blanks are successively subjected to the operations of gumming the sealing flaps, creasing the blanks, folding the flaps, drying the unclosed sealing-flap and bundling the completed envelopes, the improvements being designed with the view of making all the working parts of the machine adjustable, so that envelopes of any desired size can be made on the machine, while it can also be adjusted and operated for making any one of the standard-sizes of envelopes.

The invention consists of an envelope-machine, which comprises, first, a recessed blank-feeding table on which the pile of blanks is placed and retained by adjustable gages, said table being gradually raised by suitable mechanism, so as to supply the blanks to the mucilage-pads; secondly, a vertically-reciprocating frame to which the mucilage-pads are applied, the adjustable sides of said pads being supplied with mucilage by horizontally-reciprocating rollers which form intermittent contact with rollers in mucilage-fountains; thirdly, a stripper which is also provided with adjustable sections by which the gummed blanks are removed from the mucilage-pads and dropped on to a horizontally-reciprocating and adjustable carrier that transfers the blanks to the creasing-mechanism, so that the plunger on being lowered into the box, creases the flaps of the blanks, the box and plunger of the creasing-mechanism being likewise adjustable, so as to provide for the different sizes of envelopes to be made on the machine; fourthly, hinged folding-flaps that are arranged vertically below the creasing-mechanism and to which the creased blanks are transmitted by the plunger, so that the flaps are successively folded, the upper sealing-flap being prevented from being sealed by a suitable presser-frame on the folding flap of the lower sealing flap; fifthly, a tilting platform and pusher-arm by which the envelope is transmitted to the drying-reel; sixthly, a drying-reel which is formed of ring-shaped frames and pivoted arms that are retained in radial position by means of raised flanges on the stationary supporting rings of the reel, said reel being guided on said supporting-rings and intermittently moved forward by a suitable pawl and ratchet-mechanism; seventhly, pivoted arms and wire-rings supported in eyes of said arms, said wire-rings being adjusted concentrically to the drying-reel, so as to adapt the same for receiving envelopes of any size and hold them in position in the arms of the drying-reel until they are ready to be transferred by a horizontally-reciprocating pusher to the bunching-reel; eighthly, a bunching-reel, to the jaws of which the envelopes are successively fed so as to be bunched, said reel being intermittently rotated by suitable mechanism; lastly, actuating-mechanisms by which the different working parts of the machine are actuated by the cams on a rotating cam-shaft, as will be fully described hereinafter and finally pointed out in the claims.

Figure 2:
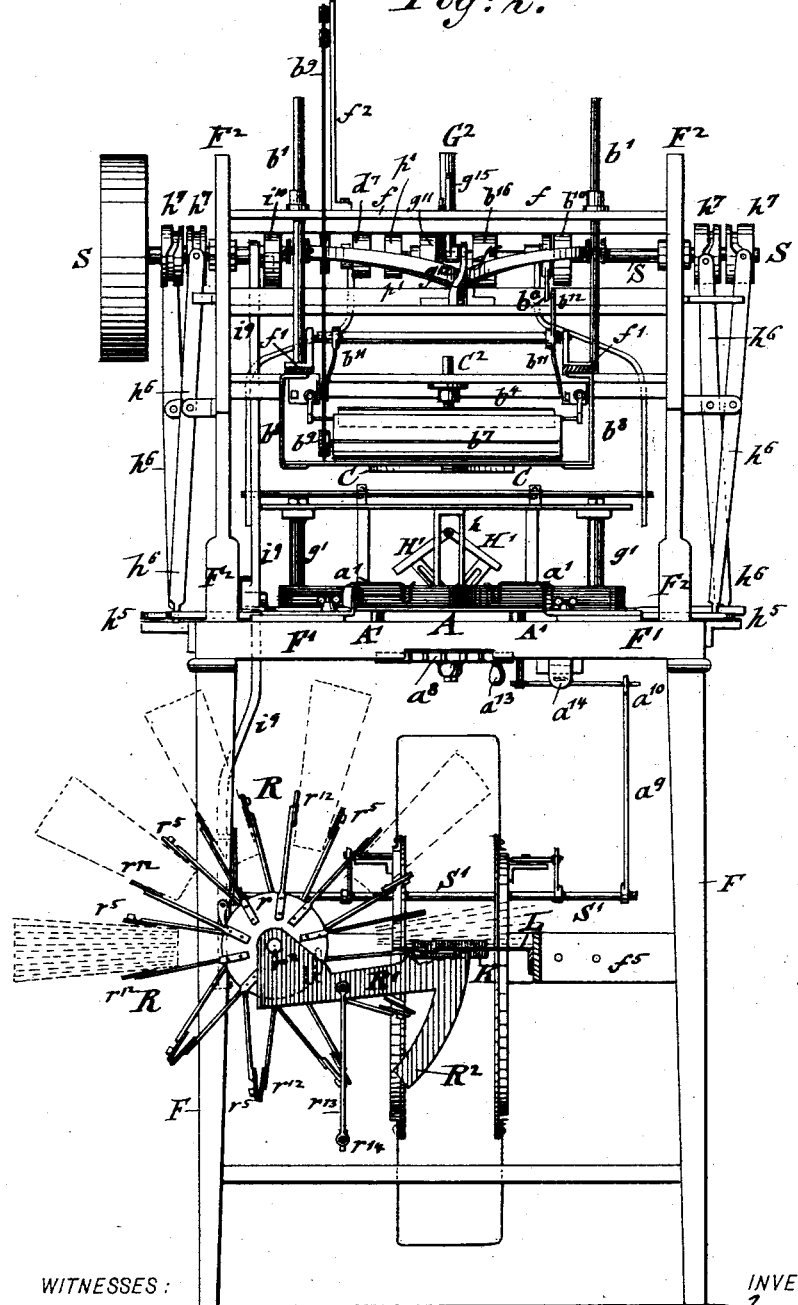
Figure 3:
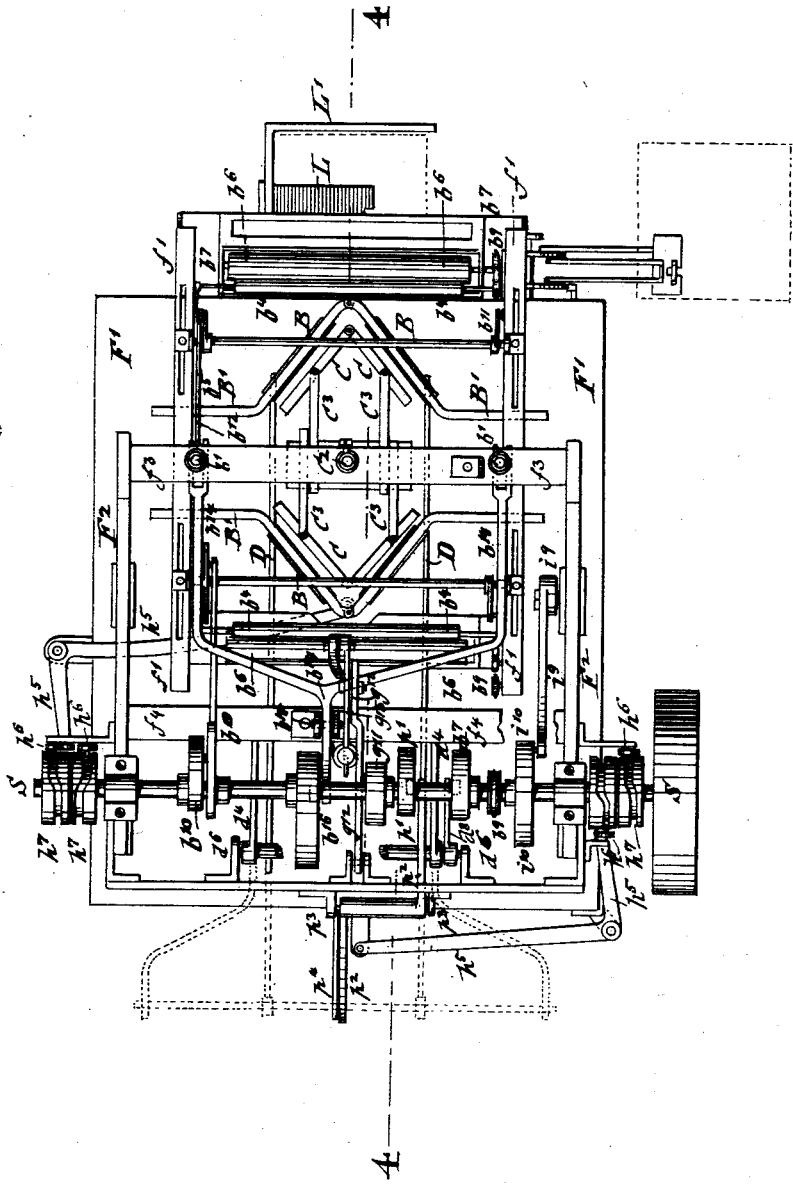
Figure 4:
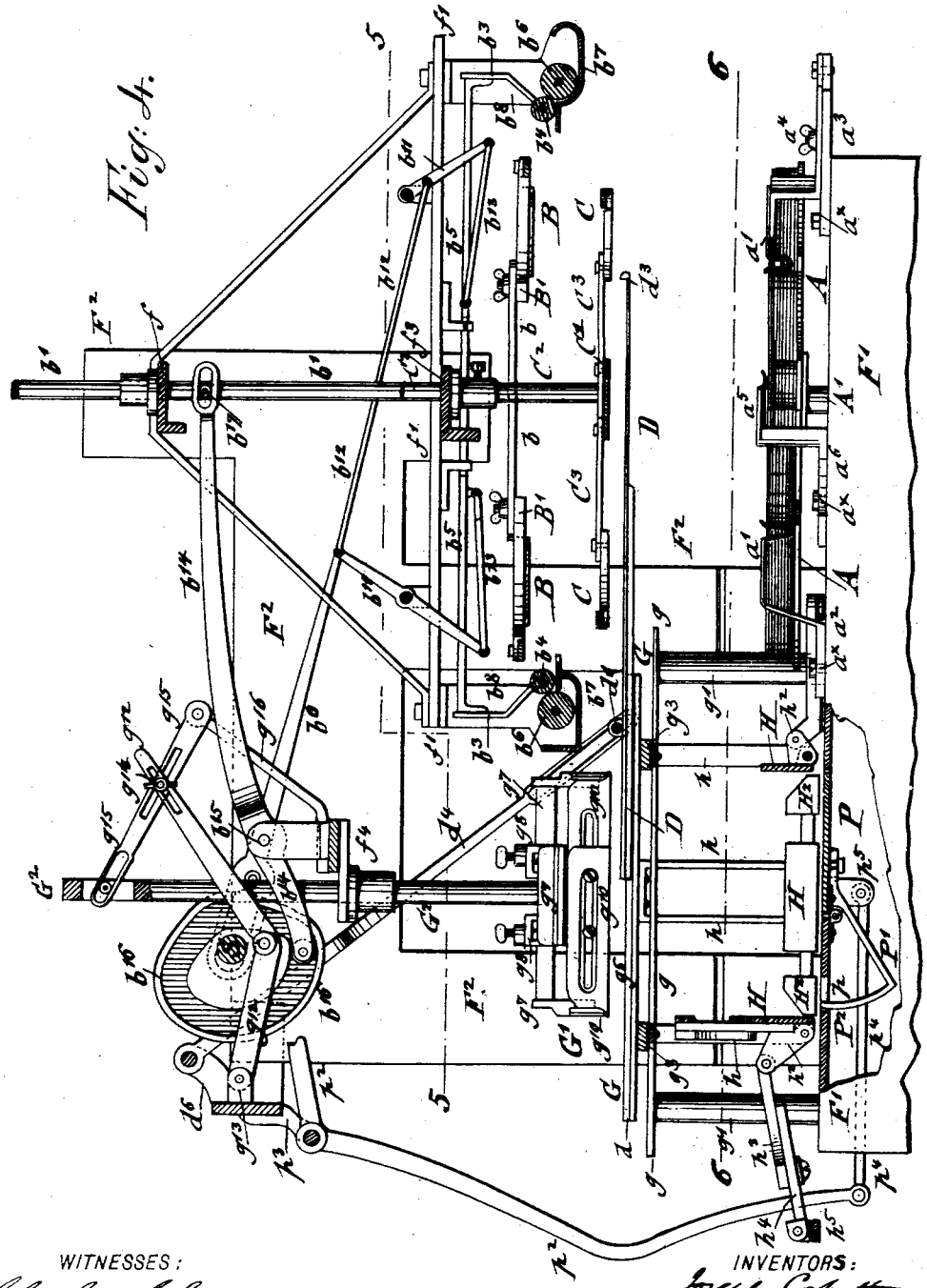
Figure 5:
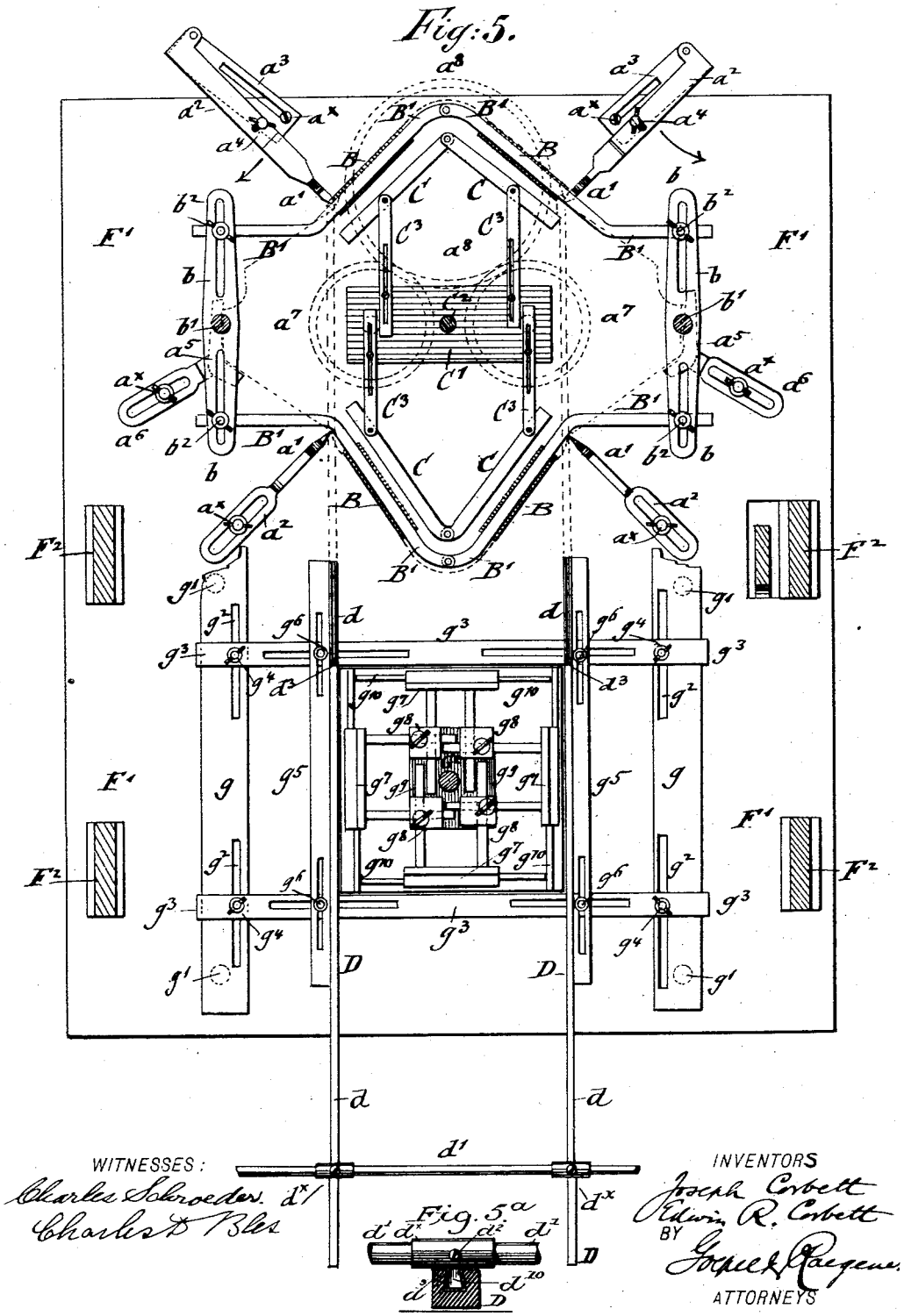
Figure 6:
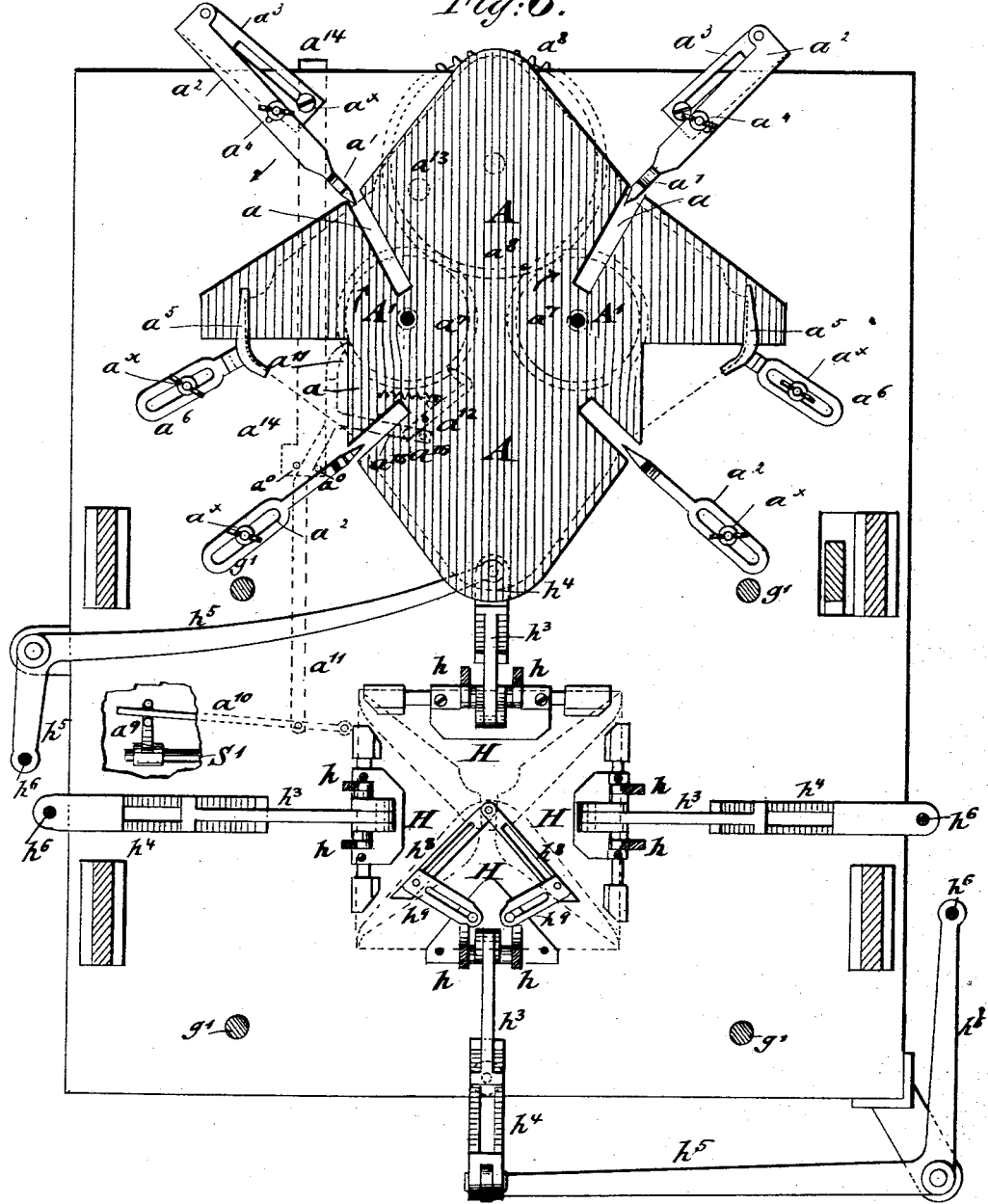
Figure 7:
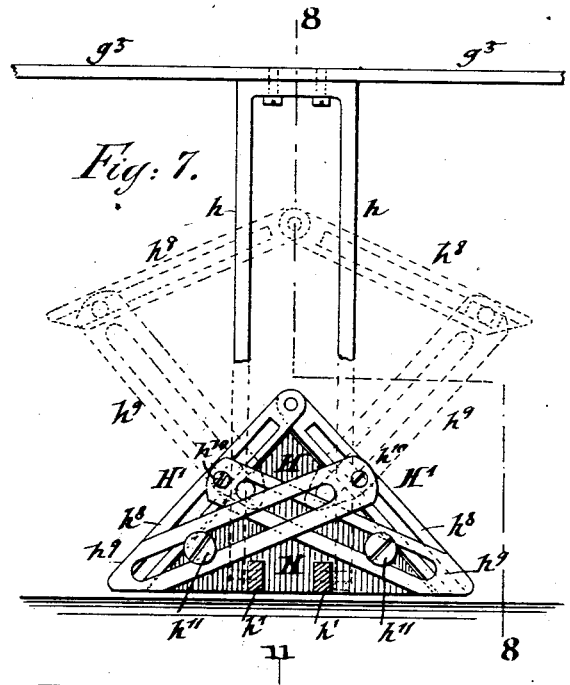
Figure 8:
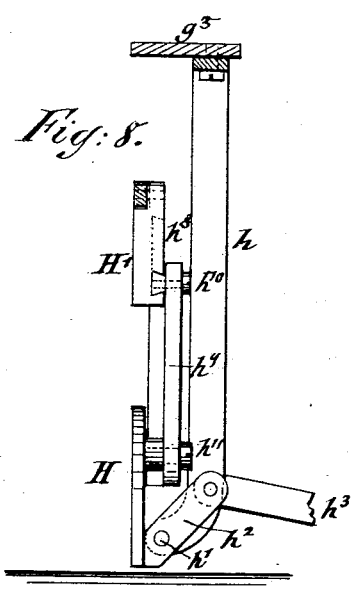
Figure 10:
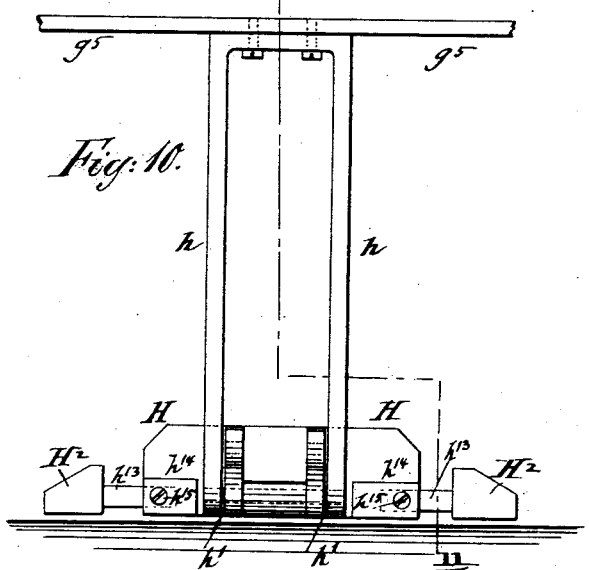
Figure 11:
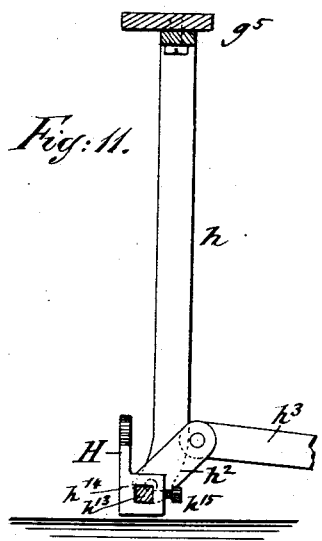
Figure 9:
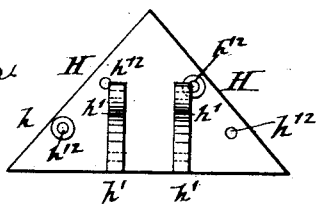
Figure 17:
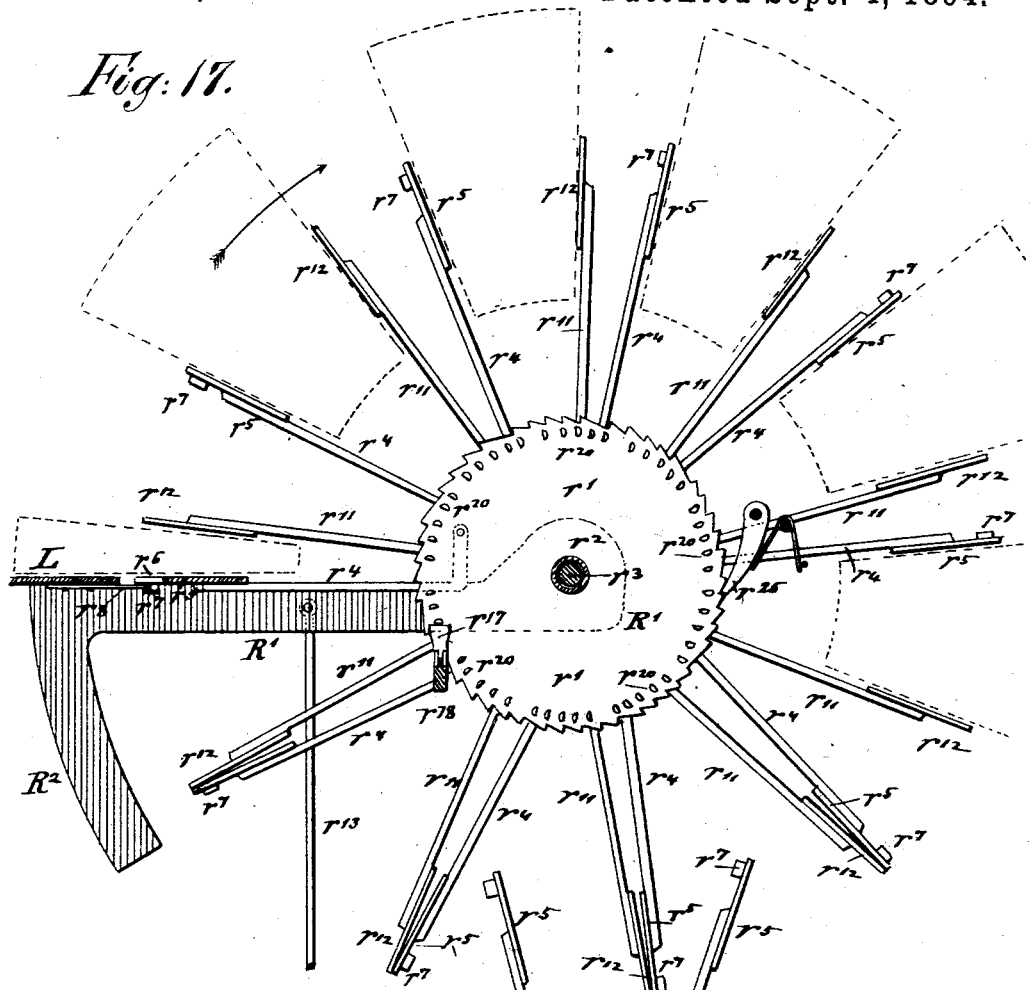
Figure 18:
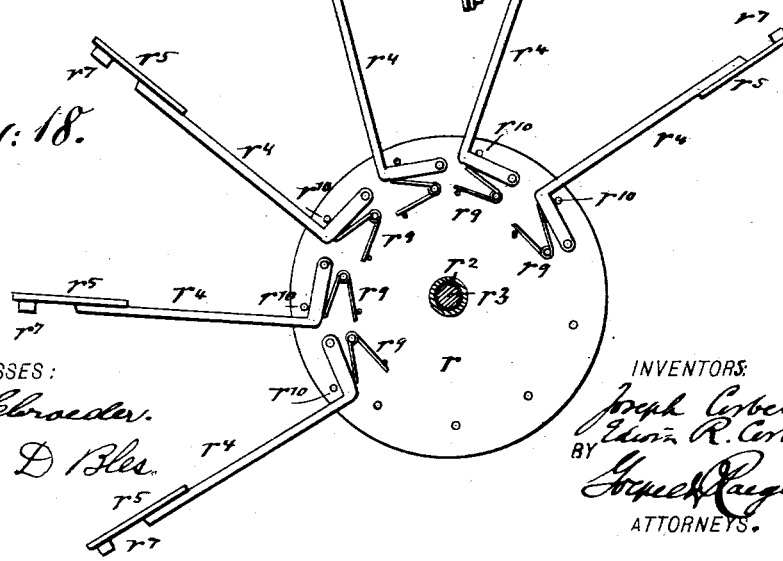

In the accompanying drawings, Figure 1 represents a side-elevation of my improved envelope-machine. Fig. 2 is a front elevation, some parts being in section. Fig. 3 is a plan-view of the machine. Fig. 4 is a vertical longitudinal section of the upper part of the machine on line 4 4, Fig. 3 showing the parts supported above the bed-plate, said figure being drawn on a larger scale. Fig. 5 is a horizontal section on line 5 5, Fig. 4, showing the mucilage-pads, stripper, carrier and creasing-mechanism in plan-view. Fig. 5ª is a detail-section showing the connection of the adjustable carrier-rods with the transverse rods by which motion is imparted to the same. Fig. 6 is a plan-view of the bed-plate and the parts supported on the same, partly in horizontal section on line 6 6, Fig. 4. Figs. 7 and 8 are respectively a side-elevation and a vertical transverse-section on line 8 8, Fig. 7, showing the lower folding-flap with its extensible presser-frame. Fig. 9 is a detail rear-elevation of the triangular main-plate of the lower folding-flap. Figs. 10 and 11 represent a rear-elevation and a vertical transverse-section, on line 11 11, Fig. 10, of one of the folding-flaps for folding the flaps of the blank. Fig. 12 is a horizontal section on line 12 12, Fig. 1, partly in section, showing a plan-view of the drying-reel and the bunching-reel. Fig. 12$^a$ is a detail section of the guide-frame of the pusher-rods. Fig. 13 is a vertical transverse-section, on line 13 13, Fig. 12, showing the drying-reel and its actuating mechanism. Fig. 14 is a side-elevation, partly in section on line 14, Fig. 13, of a portion of the drying-reel and its adjustable wire-rings by which the reel is adapted to receive envelopes of different sizes. Fig. 14$^a$ is a detail side-view showing the mechanism for adjusting the arms of the extension-wires of the drying reel. Figs. 15 and 16 are details of the mechanism by which intermittent rotary motion is transmitted to the bunching-reel and the oscillating plate of the same. Fig. 17 is a side-elevation, partly in section, on a larger scale, showing the bunching-reel and its oscillating plate; and Fig. 18 is a detail side-elevation of a portion of the bunching-reel, showing the spring-cushioned jaws of the same.

Similar letters of reference indicate corresponding parts.

My improved envelope-machine is arranged for supplying from a gradually-rising blank-feeding table a blank of any suitable size to the descending mucilage-pads, the blank being transferred from the pads by a stripper to a horizontally-reciprocating carrier and by the latter to a creasing-mechanism for creasing, from which it is transferred to the folding-flaps for folding and sealing. The envelopes are then transmitted to an intermittently rotating drying-reel and from the same by a horizontally-reciprocating pusher to the bunching-reel, in which bunches of twenty-five envelopes each may be formed and fastened by a band and then removed from the reel.

For carrying on the different operations described until a bunch of finished envelopes is produced from the blanks, the following main-parts are used, namely a table A for the blanks, mucilage-pads B, a stripper C, a horizontally-reciprocating carrier D, a creasing-box G, a plunger G' for said box, hinged folding-flaps H H, a tilting platform P, a drying-reel I, a reciprocating-pusher K and a bunching-reel R. All the parts described are supported by a lower frame F, a bed-plate F' and an upper frame F$^2$ and receive their motion from cams on a cam-shaft S that is supported in bearings of the upper supporting-frame F$^2$, as shown clearly in Figs. 1 and 2, in which the relative disposition of the different operative parts is shown.

*The blank-feeding table.*—The blank-feeding table A is made of a size and shape corresponding to the largest blank that can be made into an envelope by the machine, as shown in plan-view in Fig. 6, said table being provided with four inwardly-extending recesses $a$ for four gages $a'$, the rear-gages of which are provided with slotted shanks $a^2$, while the front gages are pivoted at their outer ends to slotted plates $a^3$ and adjusted by the same in forward or backward direction to the size of the blanks. The front gages $a'$ are secured by thumbscrews $a^4$ to the plates $a^3$ and can be moved sidewise on their pivots, as indicated by the arrows in Fig. 6, so as to be out of the way when a new pile of blanks is to be placed on the table A. The front and rear-gages $a'$ serve to retain the blanks in position on the table A, they being adapted to bear onto the apices of the obtuse angles formed by the flaps of the blank. The ends of the gages $a'$ are made V-shaped and adapted to press on the sides of a pile of blanks, said gages entering into the recesses $a$ on adjusting their shanks when blanks of smaller sizes are placed on the table. The slotted plates $a^3$ of the front-gages $a'$ and the slotted shanks of the rear-gages $a'$ are retained in position in the bed-plate F' by set-screws $a^\times$. Besides the four gages $a'$, two auxiliary gages $a^5$ are arranged, which are provided with angular faces, and which serve to press on the top of the pile of blanks at the outer ends of the same, as shown in Figs. 4 and 6. The angular gages $a^5$ are provided with slotted shanks $a^6$ and are secured by thumb-screws $a^\times$ in the same manner as the plates $a^3$ and rear-gages $a'$. The table A is supported on two threaded pillars A', which pass through openings of the bed-plate F' and which are engaged by the interiorly-threaded hubs of two gear-wheels $a^7$ that are made of equal size and engaged by a larger intermediate gear-wheel $a^8$, by which motion is transmitted from one gear-wheel to the other, so that both gear-wheels $a^7$ are turned at the same time and thereby the table gradually raised. Motion is transmitted to one of the gear-wheels $a^7$ from a rock-shaft S' that is supported in suitable bearings of the lower frame F, said rock-shaft S' passing through the ring-shaped frames of the drying-reel I and being provided with an upwardly-extending arm $a^9$, the forked upper end of which engages an oscillating arm $a^{10}$ which is pivoted to the under side of the bed-plate F', as shown in Fig. 6. To the arm $a^{10}$ is pivoted the shank of a pawl $a^{11}$ which engages the teeth of one of the gear-wheels $a^7$, which gear-wheel is engaged by a pivoted and spring-actuated check-pawl $a^{12}$ that is applied to a pin of the bed-frame. At each oscillation of the rock-shaft S', the gear-wheel $a^7$ is moved for the required distance by its pawl $a^{11}$, which motion is transmitted by the gear-wheel $a^8$ to the second gear-wheel $a^7$, and from the same to the pillars of the table A, so that the latter is gradually raised for feeding one blank after the other to the vertically-reciprocating mucilage-pads. When all the blanks are taken up by the mucilage-pads and fed to the other parts of the envelope-machine, a new pile blanks is placed on the table. Before doing this the machine is stopped and the table A returned to its former position. This is accomplished by providing the gear-wheel $a^8$ with a handle $a^{13}$ at its under side, so that the same can be turned by hand in an opposite direction to the motion which is imparted to it by the mechanism before described. The pawl $a^{11}$ is released during the return-motion of the gear-wheel $a^8$ from the gear-wheel $a^7$ by means of a slide-piece $a^{14}$, which is taken hold of at its front end, its rear end being provided with pins $a^0$ which engage an inclined portion of the shank of the pawl and withdraw the same from the teeth of the gear-wheel $a^7$ when the slide-piece $a^{14}$ is drawn in forward direction. At the same time a laterally-extending arm $a^{15}$ of the slide-piece $a^{11}$ engages by a pin $a^{16}$ on the same the check-pawl $a^{12}$ and releases the same from the teeth of the gear-wheel $a^7$ during the return-motion of the table. The front-gages are then moved sidewise, so that the next pile of blanks can be placed on the table. The front-gages are then replaced in position and the operation of the machine is continued.

*The mucilage-pads.*—The mucilage-pads B are supported on a frame which is formed of longer main-pieces B' and slotted transverse arms $b$, which latter are attached at their centers to supporting-rods $b'$ that are guided in sleeves of a transverse top-bar $f$ of the upper supporting-frame $F^2$, as shown in Figs. 2 and 3. The transverse arms $b$ support in their slotted parts the adjustable main-pieces B' by means of set-screws $b^2$, each main-piece being formed of a V-shaped middle portion and straight ends and composed of two semi-sections which are pivoted together at the apex of the V-shaped portion, as shown clearly in Fig. 6. The mucilage-pads B are applied to the under side of the legs of the V-shaped portions of the main-pieces B', and are either made of rubber or other suitable material, or made integral with the legs of the V-shaped portions, as desired. The mucilage is supplied to the pads B by means of two rollers $b^4$, which rollers are supported in downwardly-extending arms $b^3$ at the outer ends of a reciprocating-frame $b^5$ and adapted to rotate in contact with rollers $b^6$ that are located in the mucilage-fountains $b^7$, which are supported by downwardly-extending arms $b^8$ and are attached to longitudinal bars $f'$ of the upper supporting-frame $F^2$, as shown in Figs. 1, 2 and 4. Rotary motion is imparted to the rollers $b^6$ which turn in bearings of the fountains $b^7$ by means of a longitudinal belt $b^9$ that passes over pulleys at one end on the rollers $b^6$ and over guide-pulleys supported near one end of the fountains $b$ and on an upright standard $f^2$ that is attached to the transverse top-bar $f$ of the supporting-frame $F^2$ and also over a driving-pulley on the cam-shaft S, as shown clearly in Figs. 1 and 2. The rotating-rollers $b^6$ take up the mucilage from the fountains $b^7$ and transmit the same to the transferring-rollers $b^4$ when the latter are rotated in contact therewith. As soon as the transferring-rollers $b^4$ have taken up the mucilage from the rollers $b^6$, they are moved in opposite direction to each other over the under side of the pads B, so as to supply the required quantity of mucilage to the same. The supporting-frames $b^5$ of the transferring-rollers $b^4$ are reciprocated in opposite direction to each other at the proper moment by the cam-groove of a cam $b^{10}$ on the cam-shaft S, which cam engages an anti-friction-roller of a transmitting-lever $b^0$ that is guided by its upper slotted end on the cam-shaft, as shown in Fig. 4, the front-end of the same being pivoted to the upper end of an oscillating arm $b^{11}$ which is again connected by a pivot-rod $b^{12}$ with a second oscillating arm $b^{11}$, which arms $b^{11}$ are supported in lugs of the longitudinal bars $f'$. The lower ends of the arms $b^{11}$ are connected by pivot-links $b^{13}$ with the horizontally-reciprocating frames $b^5$ of the transferring-rollers $b^4$, as shown in Fig. 4. The guides for the reciprocating frame $b^5$ are recessed, so as to permit the passing of the connecting pivots of the links $b^{13}$, as shown in Fig. 4. By the transmitting mechanism described the transferring-rollers $b^4$ are simultaneously reciprocated, but in opposite direction to each other, whereby the simultaneous supply of mucilage of the front and rear pads is produced. As soon as the pads B have received the required supply of mucilage they are moved with their supporting-frame B' $b$ in downward direction, which motion is accomplished by means of a forked lever $b^{14}$ which is fulcrumed at $b^{15}$, the rear-end of the lever $b^{14}$ being provided with an anti-friction roller that is engaged by a cam-groove of the cam $b^{16}$, as shown in Fig. 4, while the front-ends of the forked lever $b^{14}$ are slotted and adapted to engage pins $b^{17}$ on the guide-rods $b'$ of the pad-supporting frame B' $b$. The motion of the actuating-cam $b^{16}$ is so timed that the downward motion of the mucilage-pads commences as soon as the mucilage is supplied to the same and the transferring-rollers $b^4$ are moved out of the vertical path of the same. The length of the forked transmitting-lever $b^{14}$ and the length of the supporting guide-rods $b'$ are so proportioned that the mucilage-pads descend far enough so as to form contact with the uppermost blank on the table A, which is slipped away from the auxiliary gages $a^5$ and raised with the pad-supporting frame, the upward motion being interrupted when the same arrives at a short distance below the stripper C. When the pad-supporting frame B' $b$ is in this position the horizontally-reciprocating carrier D is moved forward below the blank. The carrier D is guided in fixed ways $d$ $d$ that are arranged at the inner side of the side-rails of the box G of the creasing-mechanism, the carrier being composed of two parallel rods that are connected at their rear-parts by a transverse bar $d'$, which is provided with sleeves $d^\times$ and set-screws $d^2$, said sleeves having dovetailed lugs $d^{10}$ on which the grooved parallel bars of the carrier are adjusted by suitable set-screws $d^9$, so that the bars of the carrier D can be adjusted forward or backward, according to the size of the blanks. The front-end of each parallel bar of the carrier D is provided with an upwardly-bent lip or hook $d^3$ by which the blank is taken hold of so as to be moved in backward direction and be placed under the plunger of the creasing-mechanism. The reciprocating-motion of the carrier D is produced by means of levers $d^4$ that are slotted at their lower ends so as to engage the rods $d$ of the carrier, said levers being pivoted at their upper ends to brackets $d^6$ of the supporting-frame $F^2$ and actuated by a cam $b^7$ on the cam-shaft S, the groove of which engages an anti-friction roller on the upper end of an arm $d^8$ that is attached to the pivot-shaft of the levers $d^4$, as shown in Fig. 3, so as to impart the proper motion to the carrier D. As soon as the carrier D arrives below the blank supported on the mucilage-pads B, the upward-motion of the pad-supporting frame is continued by the motion-transmitting mechanism of the same and thereby the blank transferred by the stripper C to the carrier D. The carrier D is then moved backward until the blank arrives above the box G of the creasing-mechanism.

*The stripping device.*—The stripper C is shown clearly in Figs. 1, 4 and 5 and is composed of a central plate or web C' which is rigidly supported by a rod $C^2$ by the transverse bar $f^3$ of the upper supporting-frame $F^2$. On the web C' are supported four slotted parallel strips $C^3$, which are secured to the web C' by set-screws, as shown in Fig. 5. To the front-ends of one pair of strips $C^3$ and the rear-ends of the other pair of strips $C^3$ are pivoted the stripper-bars C C proper, which are of V-shape and made of two sections each of which are pivoted together at their apex so as to be adjusted by the slotted strips to the size of blank and by the pivot-connection of the stripper-bars C to the exact shape of the flaps of the blank, said stripper-bars being adjusted close to, inside of and parallel with the V-shaped portions of the pad-supporting frame B' $b$, as shown in Fig. 5.

*The creasing mechanism.*—The creasing-mechanism is clearly shown in Figs. 4 and 5 and consists of a box G, the transverse rails of which are supported on horizontal rails $g$ that are attached to upright pillars $g'$ of the bed-plate F. The stationary rails $g$ are provided with longitudinal slots $g^2$ in which the transverse side-rails $g^3$ are guided and secured by set-screws $g^4$ the side rails being likewise slotted for guiding the longitudinal side-rails $g^5$ of the box G. The side-rails $g^5$ are also slotted and adjusted on the slotted rails $g^3$ by set-screws $g^6$. By means of the slots and set-screws the side-rails of the creasing-box can be adjusted in a longitudinal and lateral direction, according to the size of the envelope to be made. The plunger G' is likewise formed of adjustable and extensible sections which are composed of an inner adjustable frame $g^7$, the guide-rods of which are secured by set-screws in the keepers $g^8$ on the center-portion or web $g^9$ that is rigidly applied to the shank $G^2$ of the plunger, as shown clearly in Fig. 5. The side-rails of the plunger G' are each composed of two slotted extensible plates $g^{10}$ which are secured by screws to the inner frame $g^7$ and the inner edges of which are in line with each other, so that the plunger G' can be adjusted separately to the interior of the creasing-box G. When the blank is transferred to the creasing-box by the carrier D, the plunger descends and imparts a creasing-action to the flaps of the blank by bending them in position at right-angles to the body of the blank. We do not claim in this application the construction of the creasing-mechanism, as the same is fully described and claimed in Letters Patent granted to Joseph Corbett, No. 472,253, dated April 5, 1892, to which reference is herewith made. The shank $G^2$ of the plunger G' is guided in a sleeve of a transverse bar $f^4$ of the upper supporting-frame $F^2$, vertically-reciprocating motion being imparted to the same by a cam $g^{11}$ on the cam-shaft which cam engages an anti-friction roller of a lever $g^{12}$, which is pivoted at its rear-end to a supporting-bracket $g^{13}$ of the frame $F^2$, and which is connected at its slotted front-end by a set-screw $g^{14}$ with a slotted arm $g^{15}$ that is pivoted at its front-end to a fixed supporting arm $g^{16}$ attached to the bar $f^4$ and connected by its upper slotted end with an anti-friction roller that is set into a recess at the upper end of the shank $G^2$. As soon as the blank is transferred by the carrier to the creasing box, the plunger descends so as to crease the blank at the points where the flaps are to be formed, the plunger carrying then the creased blank in downward direction below the creasing-box until the same arrives on the bed-plate F' between the vertical folding-flaps. The plunger is then raised again and returns into its normal position above the creasing-box G, the creased blank being retained by the folding-flaps, so that the same can act on the same.

*The folding-flaps.*—The folding-flaps are shown in Figs. 4, 6, 7, 8, 9, 10 and 11 and are supported on U-shaped hangers $h$, which are secured to the under sides of the transverse and longitudinal side-rails $g^3$ and $g^5$ of the creasing-box, so that the hangers are adjusted with said rails to the exact size of the envelope to be produced. The lower ends of the U-shaped hangers $h$ are curved and provided with eyes or bearings for the pintles $h'$ of the folding-flaps H, said pintles passing through ears $h^2$ at the rear edges of the flaps H. The ears $h^2$ extend at an upward angle in relation to the flaps and are pivoted at their upper ends to connecting-rods $h^3$, the opposite ends of which are connected with the straps $h^4$ and adjusted on the same to the sitions to which the flaps are adjusted with the side-rails of the creasing-box. The outer ends of the straps $h^4$ of two opposite flaps H are swiveled to fulcrumed elbow-levers $h^5$, the opposite arms of which are connected by levers $h^6$ that are fulcrumed to the upright side-standards of the frame $F^2$, with grooved cams $h^7$ on the cam-shaft S. The straps $h^4$ of the other two flaps H are directly connected to fulcrumed levers $h^6$, as shown in Figs. 1 and 6. Each folding-flap H is provided with its own adjustable motion transmitting-mechanism that is actuated by the cam $h^7$, which cams $h^7$ are arranged in pairs, one pair near each end of the cam-shaft S, as shown in Figs. 2 and 3, the motion imparted by said cams to the transmitting-mechanisms being so timed that the folding-action of the flaps H takes place successively one after the other as soon as the blank is delivered to the flaps by the plunger G'. For this purpose the flap at one end of the blank is first folded, then the opposite end-flap, then the lower gummed flap and finally the upper sealing-flap. For the purpose of securing the adhesion of the lower gummed flap and preventing the adhesion of the upper sealing flap, the folding flap H for the lower gummed flap of the blank is provided with a presser-frame H' that is shown in full lines in Figs. 6 and 8 and in dotted lines in Fig. 7, said presser-frame being composed of four slotted extensible pieces $h^8$ $h^9$ of which the two outer pieces $h^8$ are pivoted together at their ends, while the two inner pieces $h^9$ are connected by set-screws $h^{10}$ to the outer pieces $h^8$ and by set-screws $h^{11}$ to the flap H, so that they can be adjusted to the exact size of the flap to be folded and pressed down over the end-flap of the blank. The flap H is provided with two pairs of threaded holes $h^{12}$ for the set screws $h^{11}$ of the inner pieces $h^9$, the lower holes serving for adjusting the inner pieces of the presser-frame H' on the flap H, so as to adjust the outer pieces $h^8$ within a determined distance from the flap H, while the upper holes serve for adjusting the same pieces $h^9$ of the presser-frame H' on the flap H so as to set the outer pieces $h^8$ at a greater distance from the same, as required by the size of the envelope. The extreme outermost position of the outer pieces $h^8$ for the largest size of envelope that can be made on the machine is shown in dotted line in Fig. 7 and in full lines in Fig. 8. When the flap H of the presser-frame H' is in vertical position, the faces of the outer pieces $h^8$ are in line with the under side of the flap and with the inner edge of the corresponding side-rail of the creasing box G, as shown in Fig. 8, while the faces of the remaining flaps H are in line with the inner edges of the rails of the creasing-box G, as shown in Fig. 11, so that the creased blank when it is passed downward by the plunger along the faces of the flaps is not obstructed in its downward motion, but guided along the same, so that when the blank arrives on the bedplate F', the flaps of the blank are ready for the action of the folding flaps H. The flaps H by which the end-flaps and the sealing-flap of the blank are folded are provided with extensible auxiliary sections $H^2$ which are inserted by their square shank $h^{13}$ into corresponding sockets $h^{14}$ arranged at the rear-parts of the flaps H, said shanks being secured in position by set-screws $h^{15}$. The upper corners of the auxiliary flaps $H^2$ are cut off, so as to form inclined edges. The auxiliary flaps $H^2$ serve practically as extensions of the main-flaps, so that the flaps H $H^2$ can be adjusted for any suitable size of blank. The presser-frame H' holds the lower gummed flap of the blank in position, so that it seals the same to the end-flaps. It also prevents the sealing of the upper flap of the envelope, as the sealing-flap is prevented by the thickness of the outer pieces $h^8$ of the presser-frame from adhering to the end-flaps, notwithstanding the folding-action of its flap H on the sealing-flap of the envelope.

*The tilting platform.*—When the folding of the flaps of the blanks and the sealing of the lower gummed flaps to the end-flaps is accomplished, or in other words, the blank changed into an envelope, the envelope is passed along a tilting platform P, which is arranged in the bedplate F' and hinged at one end to the same, to the space between two arms of the drying-reel I. To the under side of the tilting platform P is applied an inclined and backwardly-extending arm P', which has an arc-shaped portion $P^2$ at its outer end, which passes through a slot $p$ in the bed-plate F'. The arm P' is adjusted along the under side of the platform P by means of a slot and set-screw $p^x$, so that the end of the curved portion $P^2$ can strike the envelope, whatever be its size, so as to lift the same and cause it to slide down over the tilting platform P. The platform P and its arm P' is shown in full lines in Fig. 4 and in dropped position in Fig. 1. The mechanism for dropping the platform P at the proper time is composed of a cam $p'$ on the cam-shaft S, the cam-groove of which engages an anti-friction roller at the end of an elbow-lever $p^2$, which is fulcrumed to a bracket $p^3$ of the upper supporting-frame $F^2$. The lower end of the elbow-lever $p^2$ is connected by a pivot-rod $p^4$ with lugs $p^5$ at the under side of the platform P, as shown in Fig. 4. As soon as the folding-flaps have completed the folding operation, the platform is tilted, the curved arm $P^2$ lifted above the bedplate, the envelope raised into inclined position and then slid in downward direction along the inclined platform P and deposited between two arms of the drying-reel I, as shown in Fig. 1.

*The drying-reel.*—The drying-reel I is supported below the bed-frame F' on stationary rings I' of the lower supporting-frame F. It is shown clearly in Figs. 1, 12, 13 and 14 and is composed of two ring-shaped frames $i$ which are guided on anti-friction rollers of the stationary rings I', which are provided at their outer circumference with inwardly-projecting flanges $i'$ that extend toward the ring-shaped frames $i$. To the circumference of the ring-shaped main-frames $i$ are pivoted the inner ends of U-shaped wire-arms $i^2$, said inner ends being arranged at an obtuse angle to the main-portions of the arms $i^2$, as shown in Fig. 14 and bent outwardly over the flanges $i'$ at their ends, as shown in Fig. 13. The inner outwardly-bent ends of the arms $i^2$ move along the flanges $i'$ of the fixed frames $i$ and are thereby kept by said flanges in contact with fixed stop-pins $i^3$ which are attached to the frames $i$, so that the wire-arms $i^2$ are firmly held in radial position on the ring-shaped frames $i$, as shown in Figs. 1 and 14, the flanges $i'$ acting in the nature of a cam on the inner ends of the wire-arms $i^2$ of the drying-reel I. The flanges $i'$ are not extended entirely around the circumference of the stationary rings I', but are omitted for some distance at the upper partitions of the same, so that when the arms $i^2$ arrive at the open portions, the inner ends of the same are released from the flanges and the arms dropped out of their radial position to the frames $i$, as shown in Figs. 1 and 14. When the arms $i^2$ approach the point where the folded envelope is dropped from the inclined platform P, the inner ends of the arms are engaged by the flanges $i'$. The adjacent arms of the reel I form at the point where the arms are engaged by the flanges $i$ a larger space so as to secure the delivery of the envelope to the arms. As soon as the envelope is delivered to the larger space between two adjacent arms $i^2$ at the upper part of the reel I, the inner ends of the loose arm $i^2$ is re-engaged by the flanges $i^2$ and moved up against the stop-pins $i^3$, so as to lock the arm $i^2$ firmly into a radial position to the ring-frame $i$ and support the envelope in position, which is then moved forward by the reel. As the spaces between the wire-arms are thus supplied one after the other with an envelope, they are moved by the intermittent or step-by-step rotary-motion which is imparted by suitable transmitting-mechanism from the cam-shaft S to the reel. The stationary rings I' are attached to bent arms $f^5$ of the lower supporting-frame F, as shown clearly in Fig. 12, while the movable ring-frames $i$ are provided inside of the flanges $i'$ with ratchet-teeth $i^4$, which are engaged by pawls $i^5$ that are applied to the inner ends of fulcrumed levers $i^6$, the outer ends of which are provided with anti-friction rollers that are engaged by forked ends of arms $i^7$ attached to the rock-shaft S' that is supported in bearings of fixed brackets $i^8$, which are attached to the stationary rings I', as shown clearly in Fig. 13. Oscillating-motion is imparted to the rock-shaft S' by means of a lever $i^9$ which is fulcrumed to the upper supporting-frame $F^2$ and engaged at its upper end by the cam-groove of a cam $i^{10}$ on the cam-shaft S, as shown in Fig. 1. The lower portion of the fulcrumed lever $i^9$ is connected by a pivot $i^{11}$ with an arm $i^{12}$ that is applied to the end of the rock-shaft S'. The oscillating-motion of the rock-shaft S' imparts by the intermediate mechanism described an intermittent rotary step-by-step motion to the drying-reel around the stationary ring-frames $i'$ and subjects thereby the envelopes supported between the arms of the reel to a drying-action, while the reel is moved through the greater part of its rotation. As it is necessary to adjust the reel I for envelopes of different sizes, the drying-reel is provided with ring-shaped extension-wires $I^2$, which are supported in eyes at the outer ends of curved arms $I^3$, that are pivoted at their inner ends to the ring-frames $i$. A ring-shaped extension-wire $I^2$ is arranged along one side of the radial wire-arms $i^2$ while the other extension-wire is located near the other side of the wire-arms $i^2$, as shown in Fig. 13. The ring-shaped extension-wires $I^2$ are preferably made of two sections, which overlap each other to some extent, as shown in Fig. 14, each section being supported by three or more arms $I^3$ which are adjusted simultaneously by means of connecting-rods $I^4$, which are located inside the circumference of the ring-frames $i$ and by providing the inner end of one of the supporting-arms $I^3$ of each semi-section of the extension-wire $i^2$ with a plate $i^{13}$ provided with an arc-shaped slot $i^{14}$ and a set-screw $i^{15}$ by which the position of the curved arms $I^3$ is adjusted and thereby the extension-wires $I^2$ supported at a greater or smaller distance from the ring-frames $i$, as shown in Fig. 14. The overlapping ends of the extension-wires $I^2$ serve for providing the extra-length necessary when they are adjusted at a greater distance from the ring-frames $i$, which adjustment is required when envelopes of smaller size are made on the machine, as shown in dotted lines in Fig. 13. When envelopes of large size are made, the extension-wires $I^2$ are not used in their extended position and are then folded alongside of the ring-frames $i$ within the circumference of the same by placing the arms $I^3$ also alongside of said frames and fastening the set-screws $i^{15}$ so as to retain the arms and extension-wires firmly in position alongside of the ring-frames $i$. Below the drying-reel I is supported on a frame F a semi-circular guide-shell $I^4$, along which the envelopes are moved by the arms of the reel until they arrive at the front-part of the machine where they are delivered successively from the wire-arms $i^2$ of the reel by the horizontally-reciprocating pusher K to the holding-jaws of the bunching-reel.

*The reciprocating pusher.*—The horizontally-reciprocating pusher K is supported at the outer ends of parallel guide-rods K' which are guided in holes of a fixed supporting-frame $K^2$ that is located in the space between the stationary and movable ring-frames I' and $i$ of the drying-reel, as shown in Figs. 12 and 13. The rear-ends of the guide-rods K' are curved in downward and forward direction so as to extend below the frame $K^2$ and are connected by a transverse-piece $K^3$, which is provided at its center with a downwardly-projecting pin $K^4$ that is engaged by the forked inner end of the fulcrumed lever $K^5$, the outer end of which is provided with an anti-friction roller. The fulcrum of the lever $K^5$ is supported on a horizontal bracket $K^6$ attached to the bent straps $f^5$ of the lower supporting-frame F. The outer end of the fulcrumed lever $K^5$ is engaged by the forked lower end of the fulcrumed motion-transmitting lever $i^9$, so that by the oscillating motion of the lever $i^9$ a corresponding oscillating-motion is imparted to the fulcrumed lever $K^5$. To provide for the free unrestrained oscillating-motion of the lever $K^5$, the lower forked end of the lever $i^9$ is provided with a freely-turning rod $i^{16}$, which is supported in bracket-bearings of the lever $i^9$, as shown in Figs. 1, 12 and 13, so that the lower forked end of the rod $i^{16}$ can freely turn on its axis and "give" sufficiently to provide for the transmission of motion from the vertically-oscillating lever $i^9$ to the horizontally-oscillating lever $K^5$. The inner arm of the fulcrumed lever $K^5$ is made considerably longer than the outer arm of the same, so that the pusher K is moved for the distance necessary for the transferring of the envelopes from the arms $i^2$ of the reel I onto the fixed horizontal bracket-plate L and the holding-jaws of the bunching-reel, as indicated in dotted lines in Fig. 12, in which figure the position of the envelope is shown in dotted lines as the same is supported on the arm of the drying-reel and the position of the envelope when the same is delivered onto the bracket-plate L, ready to be taken up by the holding-jaws of the bunching-reel. The pusher requires no adjustment, as it moves forward any size of envelope from the arms of the drying-reel onto the bracket-plate which is located in line with the horizontal axes of the drying and bunching reels. The bracket-plate L is supported by a bent bracket-arm $f^6$, which is attached to the lefthand strap $f^5$ of the supporting-frame A. An angular gage L' is also attached to the bracket-arm $f^6$ by means of set-screws $f^7$ which engage the inner end of the gage L' and pass through a slot $f^8$ of the bracket-arm $f^6$, so as to permit the adjustment of the gage L' to the required size of envelope.

*The bunching-reel.*—The bunching-reel R is arranged at the front part of the machine, at right-angles to and at one side of the longitudinal axis of the same. It is shown in front-elevation in Fig. 1, in plan-view in Fig. 12 and in detail in Figs. 17 and 18. The bunching-reel is composed of two disks $r\ r'$ which turn loosely by means of a transverse hub $r^2$ on a fixed shaft $r^3$ that is attached to one of the bracket-straps $f^5$ on the supporting-frame F. To the disks $r\ r'$ are pivoted U-shaped arms $r^4$ which are bent at their inner ends at right-angles to the main-parts of the arms and provided at their outer ends with rectangular plates or jaws $r^5$. Each jaw $r^5$ is provided with a recess $r^6$ that extends from the outer edge inwardly and with a keeper $r^7$ which extends transversely across said recess at the under side of the jaw $r^5$, so that a projecting latch $r^8$ that is attached to the under side of the fixed bracket-plate L can enter into the keeper $r^7$ when the jaw $r^5$ is on a level with the bracket-plate L, as shown in Figs. 12 and 17. The L-shaped inner ends of the U-shaped supporting-arms $r^4$ are acted upon by V-springs $r^9$ which press the inner ends of the arms $r^4$ against stop-pins $r^{10}$ and hold them in normal position on the disks $r\ r'$ so as to extend radially therefrom. To the outer side of the disk $r$ are rigidly attached radial arms $r^{11}$ which carry at their outer ends rectangular plates or jaws $r^{12}$, which in connection with the jaws $r^5$ serve to hold the bunches of envelopes after each pair of jaws $r^5\ r^{12}$ is supplied with the required number of envelopes. The jaws $r^{12}$ are also provided with recesses $r^x$ in line with the recesses $r^6$ of the jaws $r^5$ and the latch $r^8$, so that the jaws $r^{12}$ can pass the latch without being stopped by the same. To the outer end of the fixed shaft $r^2$ is applied an oscillating-plate R', which is clearly shown in Fig. 2, and which is provided at its outer end with a downwardly-extending arc-shaped portion $R^2$, said outer end projecting into a recess $l$ of the bracket-plate L. The oscillating-plate R' $R^2$ is preferably provided at that part which is adjacent to the jaws of the bunching-reel with a rectangular offset, $R^3$ as shown in Fig. 12, so as to move readily past the jaws. The oscillating-plate R' $R^2$ is connected by a pivot-rod $r^{13}$ with a bent fulcrumed lever $r^{14}$ that is clearly shown in Fig. 1, said lever being fulcrumed to one of the bracket-straps $f^5$ of the supporting-frame F and provided with a rounded-off inner end or heel which is acted upon by a toe $r^{15}$ that is attached to the oscillating lever $K^5$, as shown clearly in Figs. 12 and 15. When the toe $r^{15}$ acts on the heel-end of the lever $r^{14}$, the latter is moved in downward direction against the tension of the spring $r^{16}$, shown in Fig. 1, which spring is attached to the lever $r^{14}$ and to a fixed point on the bracket-strap $f^5$, so that the outer end of the lever $r^{14}$ is lowered and thereby the oscillating-plate R' also lowered below the level of the bracket-plate L. This lowering action takes place when the pusher K is commencing to move the envelope over the bracket-plate L, so that the plate $R^2$ is out of the way of the envelope, when the same can be pushed forward over the bracket-plate L against the gage L'. As soon as the envelope arrives in this position, the toe $r^{15}$ releases the heel-end of the lever $r^{14}$, so that the outer end of the lever $r^{14}$ is lifted again by the spring $r^{16}$, which lifts thereby the oscillating-plate $R^2$ above the level of the bracket-plate L and presses it against the under side of the envelope just fed over the bracket-plate L. As the jaw $r^5$ is during this time on a level with the bracket-plate L, the pusher K moves the envelope over the bracket-plate and jaw, the envelope being then lifted by the edge of the vertically-oscillating plate $R^2$ and pressed against the other jaw $r^{12}$ of the pair. When the next envelope is pushed forward, the same is moved over the bracket-plate L, and as it approaches the oscillating-plate $R^2$, the same descends and permits the continuous forward motion of the envelope until it arrives at the gage $L'$. This envelope is then taken up by the oscillating-plate $R^2$ on the return-motion of the same and pressed against the jaw $r^{12}$, and so on. When five envelopes are thus fed in succession, one below the other, to the bracket-plate and taken up between the holding-jaws, the bunching-reel R is rotated on its axis for a short distance, which is accomplished by the action of a pawl $r^{17}$ that is applied to the outer end of a fulcrumed lever $r^{18}$, the inner end of which is engaged by the teeth of a spur-wheel $r^{19}$, which is clearly shown in Figs. 15 and 16. The pawl $r^{17}$ engages pins or teeth $r^{20}$ which are arranged in groups of five teeth each on the inner face of the disk $r'$, as shown clearly in Fig. 17, the distance between the teeth being so proportioned that five envelopes can be fed from the drying-reel to the space between each pair of holding-jaws before the next motion of the bunching reel R takes place. Rotary motion is imparted to the lever-actuating spur-wheel $r^{19}$ by means of a ratchet-wheel $r^{21}$ which is keyed to the shaft of the spur-wheel $r^{19}$ by a spring-actuated pawl $r^{22}$ which is applied to the toe $r^{15}$ on the oscillating-lever $K^5$, as shown in Fig. 15. Intermediately between the ratchet-wheel $r^{21}$ and the spur-wheel $r^{19}$ is arranged a smaller ratchet-wheel $r^{23}$ which is engaged by a check-pawl $r^{24}$, said intermediate ratchet-wheel having the same number of teeth as the main ratchet-wheel $r^{21}$ and serving in connection with the check-pawl to prevent the ratchet-wheel $r^{21}$ from moving in the opposite direction. The main ratchet-wheel $r^{21}$ is provided with one tooth of greater width which is arranged in such a relative position to a longer spur-tooth of the spur-wheel $r^{19}$ that when the pawl $r^{22}$ engages the wider tooth $r^0$ of the ratchet-wheel $r^{21}$, the longer spur of the spur-wheel $r^{19}$ engages the lever $r^{18}$ and moves the pawl at the outer end of the same to a greater distance, so that the greater space between the two adjoining groups of teeth $r^{20}$ is overcome and thereby the bunching-reel moved for this distance, so as to place the spring-actuated jaw of the next pair of holding-jaws on a level with the bracket-plate L and into locking-action therewith. This greater motion is imparted to the bunching-reel when twenty-five envelopes in succession are fed to the holding-jaws, or, in other words, when one group of teeth on the disk $r'$ was engaged in succession by the actuating-pawl $r^{17}$. By the co-operation of the wider tooth of the ratchet-wheel $r^{21}$ and the longer spur of the spur-wheel $r^{19}$, the lever $r^{18}$ and pawl $r^{17}$, the bunching-reel R is moved sufficiently so that the pawl $r^{17}$ can at the next motion of the lever $r^{18}$ engage the first tooth of the next group of teeth, and so on. This extra motion imparted to the reel R also serves to bring the next set of holding-jaws into proper relative position to the fixed bracket-plate L and the vertically oscillating plate $R'$. When this is accomplished, the supply of envelopes to the next pair of holding-jaws takes place in the manner before described, until gradually one pair of holding-jaws after the other is gradually supplied with a bunch of twenty-five envelopes. As a pair of jaws $r^5$ $r^{12}$ receives gradually its full complement of envelopes, the inner L-shaped end of the supporting-arm $r^4$ of the jaw $r^5$ is pressed by the intermittently-advancing motion of the disk $r'$ against its spring $r^9$, so as to gradually shift the position of the arm away from the stop-pin $r^{10}$, which motion is so timed that when twenty-five envelopes are introduced between the jaws the latch $r^8$ releases the keeper $r^7$ of the jaw $r^5$, so that the jaw is free to follow the extra-motion imparted to the bunching-reel by the wider tooth of the ratchet-wheel $r^{21}$ and the larger spur of the spur-wheel $r^{19}$. As the jaw $r^{12}$ is supported by the fixed arm $r^{11}$, the jaw $r^5$ has to give as the envelopes are gradually supplied to the space between the same, so that in connection with the step by step forward motion of the reel R, the jaw $r^5$ is moved slowly away from the latch $r^8$ until when the last envelope is supplied the release of the keeper $r^7$ from the latch $r^8$ and the forward motion of the holding-jaws take place. A spring-actuated check-pawl $r^{25}$ engages ratchet-teeth arranged at the circumference of the inner disk $r'$ and prevents the bunching-reel from turning in the direction opposite to that indicated by the arrow, as shown in Fig. 17. By the forward motion of the reel the jaw $r^5$ of the next pair of jaws is engaged by the latch $r^8$ and retained on a level with the bracket-plate L. The envelopes are then gradually fed to the jaws $r^5$ and $r^{12}$, as described, while the jaw $r^{12}$ recedes more and more from the jaw $r^5$ owing to the step by step rotating motion of the reel and the fact that the jaw $r^5$ is retained in position on a level with the bracket-plate L by the latch $r^8$ until a full bunch of envelopes is supplied to the jaws. The jaw $r^5$ has gradually moved inwardly so that it clears the latch $r^8$ and moves forward with the reel R bringing the jaw $r^5$ of the next pair against the latch, and so on. As the jaws filled with the bunches of envelopes arrive at the outer end of the reel, a band is placed around each bunch by the attendant, who then removes the bunch from the reel. As soon as a bunch is removed, the jaws $r^5$ and $r^{12}$ form contact with each other, as shown in Fig. 17 until they arrive again at the bracket-plate L and are gradually filled with envelopes in the manner before described.

The machine operates as follows:—A pile of blanks is placed on the table A after the same has been returned to its lowermost position by turning the gear-wheel $a^7$ after the pawl $a^{10}$ has been withdrawn from the gear-wheel $a^6$. Before the pile is placed in position, the front-gages $a'\ a'$ are turned sidewise on their pivots in the direction of the arrows, Fig. 5, so that the pile can be introduced and pushed home against the rear-gages $a'$. The top-gages $a^4$ and the front-gages $a'$ are then placed in position, so that the pile of blanks is retained and the individual blanks prevented from shifting, while they can be readily taken up by the mucilage-pads. Motion is next imparted to the machine. The mucilage transferring-rollers are next passed over the faces of the mucilage-pads, the rollers taking up sufficient mucilage for this purpose from the rollers in the mucilage-fountains. As soon as the mucilage transferring-rollers are out of the way, the mucilage-pads are moved in downward direction until they form contact with the topmost blank on the pile and lift the same by the ascending motion of the pads, which is accomplished by the actuating-mechanism heretofore described until the pad arrives at a point slightly below the stripper C. The carrier D is then moved in forward direction below the blank, so that the stripper can drop the blank on the carrier as soon as the upward motion of the mucilage-pads is continued. The carrier D moves the blank in backward direction and places the same over the box of the creasing-mechanism ready for the action of the plunger, which on its descent bends up the flaps at right-angles to the body of the blank and transmits them to the folding-flaps which are arranged vertically below the creasing-box and which act on the creased flaps of the blank in quick succession, the folding-flaps turning down first one end-flap, then the opposite end-flap, then the lower gummed flap, and finally the sealing flap, the latter being prevented from adhering to the body of the envelope by the presser-frame by which the lower gummed flap is pressed down on the end-flaps so as to adhere to the same. During the downward motion of the plunger the creased blank is guided along the vertical hangers of the folding-flaps, which hangers are attached to the adjustable side-rails of the creasing-box, so that the blank cannot change its position until it arrives on the table and is ready to be folded by the hinged folding-flaps. When the flaps are folded, the envelope is completed and ready to be transferred to the drying-reel which is accomplished by the tilting platform P, which is dropped into inclined position, a pusher-arm applied to the tilting platform serving to lift the envelope and compel it to slide along the inclined platform, so that it is transferred to the space between two adjacent arms of the intermittently rotating drying-reel. The envelopes are taken by the arms of the drying-reel and conducted along a semi-circular guide-shell located at the lower part of the machine until they arrive in line with the horizontally-reciprocating pusher. In case the mucilage on the sealing-flap of the envelope is not dried during the time which is taken up by moving the same from the ingoing-end of the reel to the outgoing-end of the reel near the pusher, an artificial draft of air may be supplied, so that the drying of the mucilage is expedited. This can be arranged in any known and approved manner. The pusher transmits one envelope after another from the arms of the drying-reel to a horizontal bracket-plate and from the same to the jaws of the intermittently-rotating bunching-reel, one set of jaws taking up gradually twenty-five envelopes, upon which the next pair of jaws is locked to the bracket-plate and supplied with envelopes, and so on. As the jaws are filled with bunches of envelopes, the latter are provided with retaining-bands and removed from the jaws of the bunching-reel.

The essential new feature of our improved envelope-machine consists in the adjustability of all the operative parts of the same, so that the machine is adapted for making envelopes of any required size. For this purpose the gages for retaining the blanks on the table are made adjustable so as to hold any size of envelope, likewise the mucilage-pads and the frame that supports the same, so that not only the angle formed by the mucilage-pads with each other but also the distance between the mucilage-pads can be readily adjusted. The sections of the stripper are correspondingly adjusted, both as to the angle inclosed by the same and as to their relative distance from each other. The reciprocating-carrier being guided on the adjustable side-rails of the creasing-box is adjusted with the same, while the stroke of the carrier is in proportion to the size of the blank. The creasing-box and plunger are adjusted to any size of blank by the adjustability of the side-rails of the creasing-box and of the extensible inner frame and side-plates of the plunger. With the side-rails of the creasing-box are simultaneously adjusted the supporting-hangers of the folding-flaps, while the latter are adjusted by their auxiliary flaps and the adjustable presser-frame on the closing flap to any size of blank. The mechanism for actuating the folding flaps is adapted for adjustment to the different positions to which the folding-flaps are adjusted, according to the different sizes of envelopes to be made on the machine. The drying-reel is also adapted for any size of envelope by the arrangement of the adjustable extension-wires, so that envelopes of any size within certain limits can be readily carried along by the drying-reel. The gage for the platform of the bunching-reel is similarly adjusted to the size of the envelope, so as to secure the regular bunching of the envelopes when they are taken up by the jaws of the bunching-reel. In this manner the envelope-machine can be used for making any odd sizes of envelopes which heretofore were made by hand, and for which it does not pay to build special machines, while it enables the manufacturer to produce any size of envelope, even if a comparatively small number is ordered, in a quicker and more uniform manner than the same could be furnished heretofore.

Having thus described our invention, what we claim as new, and desire to secure by Letters Patent, is—

1. The combination, with a table, having inwardly-extending recesses, said table being adapted to receive a pile of blanks, of mechanism for intermittently feeding the same, adjustable front and rear gages extending into the recesses of the table, and adjustable side-gages for retaining the blanks, substantially as set forth.

2. The combination, with a table adapted to receive a pile of blanks, said table having screw-threaded supporting-pillars, pinions having threaded hubs for engaging the pillars, a wheel meshing with both pinions, a crank-pin attached to the under side of said gear-wheel, a pawl engaging one of said pinions, a slide-piece engaging the shank of said pawl, so that the same can be pushed back when it is desired to adjust the table by the gear-wheel independently of its motion-transmitting mechanism, substantially as set forth.

3. The combination, with a table for receiving a pile of blanks, mechanism for intermittently feeding the same, adjustable rear-gages, adjustable side-gages that press on the top of the pile and adjustable front-gages, said front-gages being pivoted to adjustable supporting-plates so as to be moved out of the way when a new pile is placed on the table, substantially as set forth.

4. A pad-supporting frame for envelope-machines composed of side-arms, main-pieces having middle portions, corresponding to the shape of the flaps, and means for adjusting the main-pieces on said arms, substantially as set forth.

5. A pad-supporting frame composed of slotted side-arms, main-pieces having V-shaped middle portions and made of two sections pivoted at the apex of the middle portion and set-screws for clamping the main-pieces to the slotted side-arms, substantially as set forth.

6. The combination, of a table for supporting a pile of blanks, means for intermittently feeding the same, a vertically-reciprocating frame having adjustable main-pieces, mucilage-pads applied to said main-pieces, and a stationary stripper composed of a central web and adjustable stripper-bars applied to said web, substantially as set forth.

7. The combination, with a table for supporting a pile of blanks, means for intermittently feeding the same, gages for holding said blanks in position on the table, a vertically-reciprocating frame composed of centrally-pivoted and adjustable main-pieces and supporting-arms and mucilage-pads applied to said main-pieces, substantially as set forth.

8. The combination, of a table adapted to receive a pile of blanks, means for intermittently feeding the same, adjustable gages adapted to retain the blanks on said table, a vertically-reciprocating frame having adjustable main-pieces, mucilage-pads applied to said main-pieces and a stationary stripper formed of adjustable sections, substantially as set forth.

9. A stripper for envelope-machines composed of a central web or plate and sections corresponding to the shape of the flaps and adapted to be adjusted on the web, substantially as set forth.

10. A stripper for envelope-machines composed of a central plate or web, V-shaped and centrally-pivoted sections, slotted supporting-strips and set-screws for said strips, substantially as set forth.

11. The combination, of a pad-supporting frame having adjustable main-pieces, mucilage-pads applied thereto, mucilage-fountains arranged at opposite sides of the pad-supporting frame, feed-rollers in said fountains, mucilage-transferring rollers and mechanism for moving the transferring rollers simultaneously in opposite directions over the pads, substantially as set forth.

12. The combination, of a pad-supporting frame, having adjustable main-pieces, mucilage-pads applied thereto, mucilage-fountains arranged at opposite sides of the pads, feed-rollers in said fountains, mucilage-transferring rollers, guide-frames for said rollers, a cam-shaft, and mechanism interposed between the cam-shaft and the guide-frames of the transferring-rollers, so as to move the same in opposite directions to each other over the pads, substantially as set forth.

13. The combination, of a table adapted to receive a pile of blanks, means for intermittently feeding the table, gages for the blanks on the table, a vertically reciprocating frame having adjustable main-pieces, mucilage-pads applied thereto, guide-rods attached to the pad-supporting frame, a cam-shaft, and mechanism interposed between the cam-shaft and the guide-rods of the pad-supporting frame, whereby a vertically reciprocating motion is imparted to the latter, substantially as set forth.

14. In an envelope-machine, a frame for supporting the mucilage-pads, said frame being composed of slotted side-arms, adjustable main-pieces having V-shaped middle-portions and formed of centrally-pivoted sections, and set-screws for connecting the slotted arms with the main-pieces, substantially as set forth.

15. The combination, of a table adapted to receive a pile of blanks, means for intermittently feeding said table, gages for retaining said blanks on the table, a vertically-reciprocating frame having adjustable main-pieces, mucilage-pads applied to said frame main-pieces, a stripper having adjustable sections and a horizontally-reciprocating carrier to which the blank is transferred from the mucilage-pads by the stripper when said carrier arrives below the blank, substantially as set forth.

16. In an envelope-machine, a carrier composed of longitudinally and laterally-adjustable rods and adjustable guides for said rods, substantially as set forth.

17. The combination, with a creasing-box having laterally-adjustable side-rails, of longitudinally-adjustable carrier-rods guided in ways of the said side-rails, a cam-shaft, and mechanism interposed between the cam-shaft and the carrier-rods for imparting reciprocating-motion to the latter, substantially as set forth.

18. The combination, with a creasing-box having adjustable side-rails, ways arranged along the longitudinal side-rails of the box, longitudinally-adjustable carrier-rods guided in said ways, and a vertically-reciprocating plunger having extensible side-plates, substantially as set forth.

19. The combination, with a creasing-box having the side-rails thereof movable whereby the size of the rectangular opening bounded thereby may be varied, of sectional folders mounted on adjustable rocking supports which are adapted to have relative arrangements corresponding to the boundaries of the creasing-box, substantially as set forth.

20. The combination, of a creasing-box having adjustable side-rails, hangers attached to the under side of said side-rails, folding-flaps pivoted to the lower ends of said hangers, and a vertically-reciprocating plunger having extensible side-plates by which the creased blank is transferred to the folding-flaps, substantially as set forth.

21. The combination, with a creasing-box having adjustable side-rails, of hangers attached to the under side of said side-rails, folding-flaps pivoted to the lower ends of said hangers, a vertically reciprocating plunger having extensible side-plates, a cam-shaft, and mechanism between the cam-shaft and the plunger for imparting reciprocating motion to the latter, substantially as set forth.

22. The combination, with a creasing-box having adjustable side-rails, hangers attached to said side-rails, folding-flaps pivoted to the lower ends of said hangers, a vertically reciprocating plunger having extensible side-plates, a cam-shaft, and mechanism between the cam-shaft and the folding-flaps, so as to actuate the latter in succession for folding the flaps of the blank, substantially as set forth.

23. In an envelope-machine, the combination, of a creasing box having adjustable side-rails, hangers attached to the side-rails, a vertically-reciprocating plunger having extensible side-plates, and folding-flaps pivoted to the lower ends of the hangers and provided with auxiliary extension-flaps, substantially as set forth.

24. In an envelope-machine, a folding-flap provided with an extensible presser-frame for sealing the flaps of envelopes of different sizes, substantially as set forth.

25. In an envelope-machine, a pivoted folding-flap having sockets in its ends and being provided with auxiliary extension-flaps having shanks guided in said sockets and set-screws for securing the shanks in said sockets, substantially as set forth.

26. The combination, in an envelope-machine, of pivoted folding-flaps having auxiliary extension-flaps, mechanism for oscillating the same, and a folding-flap provided with an extensible presser-frame for folding the gummed lower flap of the blank to the end-flaps of the same, substantially as set forth.

27. The combination, with pivoted folding-flaps, auxiliary extension-flaps applied to three of the folding-flaps, and a fourth folding-flap having a V-shaped extensible presser-frame, and means for adjusting the sections of the presser-frame on the folding-flap, substantially as set forth.

28. In an envelope-machine, a folding-flap adapted to fold the gummed lower flap of the envelope, said folding flap being provided with a V-shaped presser-frame formed of pivoted outer sections and adjustable arms pivoted to said outer sections and means for adjusting said arms on the web of the folding-flap, substantially as set forth.

29. The combination, with oscillating folding-flaps, of a supporting-table having an opening, a tilting platform hinged to said table in said opening, a lifting-arm attached to said platform and extended into a slot of the table back of the platform, a cam-shaft, and mechanism interposed between said cam-shaft and the tilting platform, so as to tilt the latter and convey the envelopes over the same, substantially as set forth.

30. The combination, with a supporting-table, of oscillating folding-flaps for the blank, a tilting platform hinged to said table and having an upwardly-extending lifting arm that passes through a slot in the supporting-table, and means for adjusting said arm on the tilting platform, substantially as set forth.

31. In an envelope machine, a drying-frame, composed of stationary frames, intermittently-rotating ring-shaped frames and radial U-shaped arms, pivoted to the ring-frames for supporting the envelopes, said stationary frames being provided with cam-flanges and stop-pins, so as to hold the radial arms rigidly in position, substantially as set forth.

32. In an envelope-machine, a drying-frame composed of ring-shaped frames, radial arms on said frames for receiving the envelopes, and extensible wire rings connected to the ring-shaped frames, substantially as set forth.

33. The combination, of stationary ring-shaped frames having inwardly-projecting flanges removed at the upper portion of the frames, an intermittently-rotating drying-frame supported on rollers of the stationary ring-frames, said drying-frame being formed of movable rings and U-shaped arms pivoted to said rings, and stop-pins for locking the arms as long as their inner ends are engaged by the flanges of the stationary rings, substantially as set forth.

34. The combination, with stationary frames provided with anti-friction rollers, a drying-reel formed of ring-shaped frames supported on said rollers, and of U shaped radial arms pivoted to said frames, ratchet-rings applied to the ring-shaped frames of the reel, pawls for engaging said ratchet-wheels, a cam-shaft and mechanism interposed between the cam-shaft and the pawls for intermittently rotating the drying-reel, substantially as set forth.

35. The combination, with an intermittently-rotating drying-reel composed of ring-shaped frames and radial arms pivoted to said frames, of curved arms pivoted to the flanged frames and provided with eyes at their outer ends, means for adjusting said arms on the ring-shaped frames and extension-wire rings supported in the eyes of the curved arms, so as to adapt the reel for envelopes of any desired size, substantially as set forth.

36. The combination, of stationary ring-shaped frames, an intermittently-rotating drying-reel having radial arms supported on said frames, a semi-circular guide-shell extending around the lower half of the drying-reel, a bracket-plate in front of the drying-reel, and a horizontally-reciprocating pusher guided in ways arranged between the stationary supporting-frames of said drying-reel, substantially as set forth.

37. The combination, with an intermittently-rotating drying-reel, a fixed bracket-plate in front of the same, a horizontally-reciprocating pusher, an adjustable gage applied to said bracket-plate, an intermittently-rotating bunching-reel arranged at right-angles to the drying-reel, so as to transmit the envelopes from the drying-reel to the bracket-plate and bunching-reel, substantially as set forth.

38. The combination, of stationary ring-shaped frames, an intermittently-reciprocating drying-reel having radial arms supported by said frames, a reciprocating pusher, a stationary guide-frame for the rods of said pusher, said guide-frame being located in the space between the supporting-frames of the drying reel, a fulcrumed lever connecting a transverse piece between the pusher-rods, a cam-shaft, and mechanism interposed between the cam-shaft and said lever, whereby reciprocating motion is imparted to the pusher after each forward motion of the drying frame, substantially as set forth.

39. The combination, with an intermittently rotating drying-reel, a reciprocating-pusher actuated after each step by step motion of the drying-reel, a fixed bracket-plate having a recess in front of the drying-reel, an adjustable gage attached to said platform, an intermittently-rotating bunching-reel having jaws for receiving the envelopes delivered to the bracket-plate by the pusher, and an oscillating-plate that is pivoted to the shaft of the bunching-reel and extending into the recess of the bracket-plate so as to lift the envelopes fed to the jaws, and at the same time permit the introduction of a new envelope to the bracket-plate and jaws, substantially as set forth.

40. The combination, with a fixed bracket-plate, an intermittently-rotating bunching-reel provided with pairs of envelope-holding jaws, a latch for retaining the lower jaw of each pair in line with the bracket-plate, and an oscillating-plate pivoted to the shaft of the bunching reel and extending into a recess of the bracket plate, said plate being adapted to lift the envelopes fed to the jaws, so as to permit the introduction of the next following envelope, substantially as set forth.

41. In an envelope-machine, a bunching-reel formed of supporting-disks, jaws supported on fixed radial arms, and yielding jaws supported on spring-actuated arms pivoted to said disks, said yielding jaws being provided with keepers at their under sides, means for retarding the yielding jaws, substantially as set forth.

42. A bunching-reel, composed of supporting disks, jaws supported on fixed arms attached to said disks, yielding jaws supported on spring-actuated arms pivoted to said disks and provided with recesses and keepers at the under side of the jaws below said recesses, means for retarding the yielding jaws substantially as set forth.

43. The combination, of a bunching-reel, composed of supporting-disks, of pairs of jaws, each pair being formed of a fixed jaw and a yielding jaw, means for retarding the yielding jaws ratchet teeth arranged in groups in one of the supporting-disks, a pawl for engaging said teeth, a fulcrumed lever, to the outer end of which said pawl is applied, spur-wheels having teeth of different sizes, pawls for actuating said spur-wheels, a cam-shaft, and mechanism interposed between the cam-shaft and said pawls, so as to impart intermittent rotary motion to the bunching-reel, substantially as set forth.

44. The combination, of a fixed bracket-plate, an intermittently-rotating bunching-reel provided with a number of pairs of holding-jaws, one jaw of each pair being fixed and the other yielding, a latch attached to the platform and adapted to engage a keeper on the under side of the yielding jaws, an oscillating-plate pivoted to the shaft of the bunching-reel and extending into a recess of the bracket-plate, mechanism for imparting intermittent oscillating motion to said plate, so as to raise the same above the bracket plate and lift the envelopes fed to the pair of jaws, the lower jaw of which is locked at the time to the bracket-plate so as permit the introduction of the next envelope, substantially as set forth.

45. The combination, with a fixed bracket-plate, an intermittently-rotating bunching-reel, pairs of jaws, one jaw of each pair being fixed, the other yielding, a latch for locking the yielding jaw successively in line with said bracket-plate, an intermittently-oscillating plate pivoted to the shaft of the bunching reel and extending into a recess of the bracket-plate, a lever connected to said oscillating-plate, a cam-shaft and mechanism between the cam-shaft and the lever connected to the oscillating plate, whereby intermittent oscillating motion is imparted to said plate, substantially as set forth.

46. The combination, with a fixed bracket-plate having a projecting latch, of an intermittently-rotating bunching-reel composed of supporting disks and pairs of jaws, one jaw of each pair being fixed, the other yielding, said jaws having recesses in line with each other and the latch and keepers extending across the recesses of the yielding jaws for successively engaging the latch, substantially as set forth.

47. The combination, of a bunching-reel composed of supporting-disks and pairs of jaws, each pair being composed of a fixed jaw and of a yielding jaw, projecting pins arranged in groups on one of the disks of the bunching reel, a fixed bracket-plate, a latch attached to said bracket plate and adapted to engage a keeper on the yielding jaws, a pawl for engaging the pins, a fulcrumed lever to the outer end of which the pawl is applied, a spur-wheel having five teeth, one tooth being larger than the others, said teeth engaging the inner end of said fulcrumed lever, a ratchet-wheel having twenty-five teeth attached to the spur-wheel with larger teeth, a pawl for engaging said ratchet-wheel, a cam-shaft, and mechanism intermediately between the cam-shaft and the pawl for said ratchet-wheel, whereby a step-by-step rotary motion is imparted to the bunching-reel, every fifth step of the bunching-reel being somewhat greater than the intermediate steps, so as to release the yielding jaw from the latch of the bracket-plate when supplied with a bunch of twenty-five envelopes, and bring the yielding jaw of the next pair of jaws in locking-connection with the bracket-plate, substantially as set forth.

In testimony that we claim the foregoing as our invention we have signed our names in presence of two subscribing witnesses.

JOSEPH CORBETT.
EDWIN R. CORBETT.

Witnesses:
PAUL GOEPEL,
CHAS. KACHLMEIER.